United States Patent

Miura et al.

[11] Patent Number: 4,647,960
[45] Date of Patent: Mar. 3, 1987

[54] VERTICAL CONTOUR EMPHASIS DE-EMPHASIS CIRCUIT

[75] Inventors: Kuniaki Miura, Ibaraki; Yasufumi Yunde, Yokohama; Kazunori Kotani; Isao Fukushima, both of Katsuta; Kenji Kano, Mito, all of Japan

[73] Assignee: Hitachi, Ltd., Tokyo, Japan

[21] Appl. No.: 777,288

[22] Filed: Sep. 18, 1985

[30] Foreign Application Priority Data

Oct. 3, 1984 [JP] Japan ................... 59-206210

[51] Int. Cl.⁴ .................. H04N 5/208; H04N 1/80
[52] U.S. Cl. .......................................... 358/37
[58] Field of Search .............. 358/36, 167, 310, 329, 358/37, 166

[56] References Cited

U.S. PATENT DOCUMENTS

| | | | |
|---|---|---|---|
| 3,836,707 | 9/1974 | Murakami et al. | 358/36 |
| 3,978,409 | 8/1976 | Dolby et al. | 358/36 |
| 4,388,729 | 6/1983 | Spencer et al. | 358/36 |
| 4,403,246 | 9/1983 | Thornberry | 358/37 |
| 4,571,613 | 2/1986 | Fukuda | 358/36 |

FOREIGN PATENT DOCUMENTS

| | | | |
|---|---|---|---|
| 18332 | 2/1978 | Japan | 358/12 |
| 144288 | 8/1984 | Japan . | |
| 2141303 | 12/1984 | United Kingdom | 358/167 |

Primary Examiner—John W. Shepperd
Attorney, Agent, or Firm—Antonelli, Terry & Wands

[57] ABSTRACT

Disclosed is a circuit for emphasizing a video signal in the vertical direction of a television picture for minimizing noise appearing during reproduction. In the circuit, a signal obtained by delaying an input video signal by one horizontal scanning period is positively fed back through a feedback circuit to the input of the input video signal. An amplitude difference signal between the video signal after being fed back through a positive feedback loop and the delayed video signal is produced and added to the input video signal to provide an output video signal.

4 Claims, 16 Drawing Figures

$$Q = (1+X) \cdot \frac{1+K_2}{1+K_1}$$

$$Q = (1+X) \cdot \frac{1+K_2}{1+K_1}$$

One

VERTICAL CONTOUR EMPHASIS DE-EMPHASIS CIRCUIT

BACKGROUND OF THE INVENTION

FIELD OF THE INVENTION

This invention relates to a video signal emphasis circuit in a magnetic recording and reproducing apparatus for a video signal, and more particularly to a circuit for emphasizing a video signal in the vertical direction of a television picture so as to minimize noise appearing in the reproduced picture.

DESCRIPTION OF THE RELATED ARTS

Figure 1A:
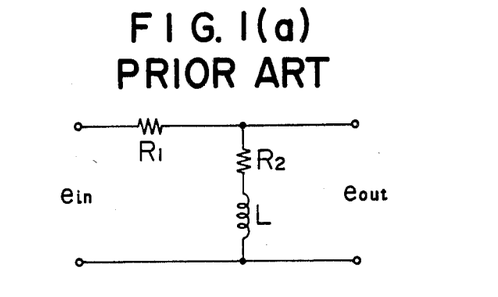
FIGS. 1(a), 1(b), 1(c) and 1(d) show a prior art horizontal emphasis circuit and its characteristics.
Figure 1B:
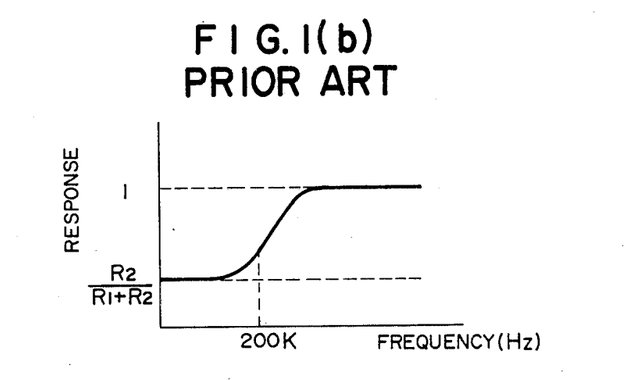
Figure 1C:
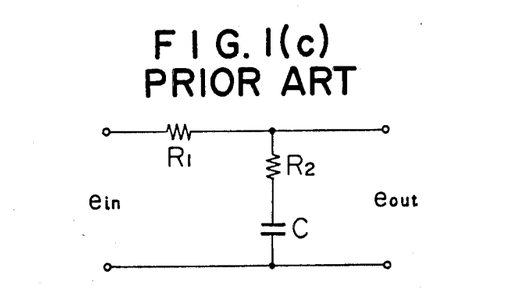

In a video signal recording and reproducing apparatus such as a video tape recorder, it is a common practice to apply pre-emphasis and de-emphasis to a video signal during recording and reproduction of the signal respectively, so as to reduce noises appearing during reproduction of the video signal. FIG. 1(a) shows one form of a prior art, horizontal pre-emphasis circuit, and FIG. 1(b) shows its frequency characteristic. A video signal in each horizontal scanning line is subjected to pre-emphasis in the circuit shown in FIG. 1(a), and, in the playback mode, the signal having been subjected to the pre-emphasis is passed through a de-emphasis circuit shown in FIG. 1(c) having a frequency characteristic as shown in FIG. 1(c) which is contrary to that shown in FIG. 1(b), so that the S/N ratio of the video signal can be improved in the hatched region shown in FIG. 1(c).

Figure 1D:
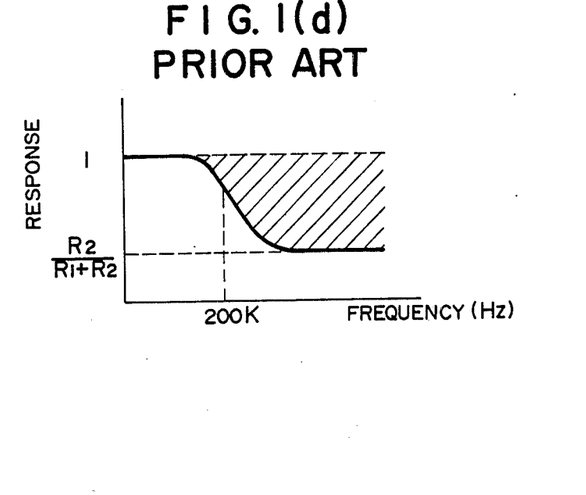

It will be seen from FIG. 1(d) that the prior art, horizontal emphasis circuit can reduce noises in a relatively high-frequency range (of, for example, higher than 200 kHz) only, and it has been difficult for the prior art circuit to reduce noises in a low-frequency range where the eyes are more susceptible to noise appearing in a reproduced picture.

As a method for improving the S/N ratio even in the low-frequency range, utilization of an image contour enhancing circuit as a pre-emphasis and de-emphasis circuits has been proposed. For example, Japanese Unexamined Patent Publication No. 59-144288 (1984) entitled "Video Signal Recording and Reproducing Apparatus" and filed by Nippon Victor Co., Ltd. (JVC) in Japan on Feb. 7, 1983 and a paper entitled "New Emphasis in Video Signal Recording and Reproducing Apparatus" reported in the General Meeting of the Institute of Television Engineers of Japan held in July, 1984, disclose a so-called vertical emphasis circuit in which video signals between adjacent horizontal scanning lines is subjected to emphasis.

SUMMARY OF THE INVENTION

It is a primary object of the present invention to provide a circuit for pre-emphasizing and de-emphasizing a video signal in the vertical direction of a television picture, in which the number of circuit elements required for determining the characteristics of the emphasis circuit is minimized to facilitate adjustment and assembling a magnetic recording and reproducing apparatus, and a nonlinear circuit can be easily incorporated therein.

In accordance with the present invention which attains the above object, there is provided an emphasis circuit emphasizing a video signal in the vertical direction of a television picture, comprising a first arithmetic circuit adding a feedback signal to an input video signal; a delay circuit delaying the output of the first arithmetic circuit by a predetermined delay time to generate a delayed output which provides the feedback signal; a second arithmetic circuit producing a signal indicative of the amplitude difference between the output of the first arithmetic and that of the delay circuit; a linear amplifier circuit adjusting the magnitude of the amplitude difference signal applied from the second arithmetic circuit to a predetermined level; and a third arithmetic circuit producing an output video signal by adding the output of the linear amplifier circuit to the input video signal.

DESCRIPTION OF THE PREFERRED EMBODIMENTS

Figure 2:
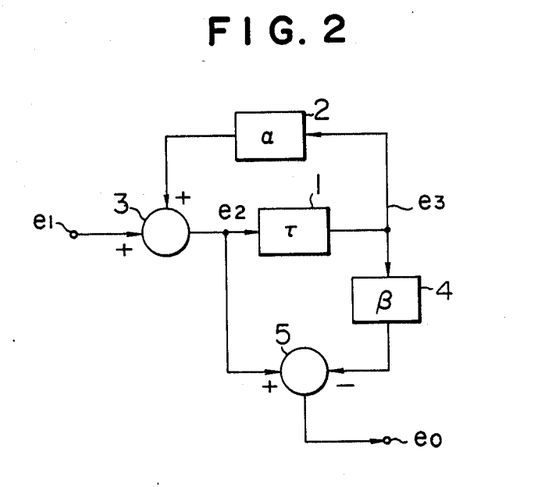
FIG. 2 is a block diagram of a vertical image contour enhancing circuit which is a basic form of the emphasis circuit according to the present invention.

Before describing the present invention in detail, the structure and operation of a circuit enhancing the contour in the vertical direction of a television picture will be described so that the present invention can be more clearly understood. FIG. 2 is a block diagram showing the structure of such a vertical contour enhacing circuit. Referring to FIG. 2, an input video signal $e_1$ is applied to one of two input terminals of an adder 3, and the output $e_2$ of the adder 3 is applied to an attenuator 2 having an attenuation factor $\alpha(\alpha<1)$ after being delayed by one horizontal scanning period 1H in a delay circuit 1 having a delay time $\tau$. The signal attenuated by the attenuator 2 is applied or fed back to the other input terminal of the adder 3. Thus, the adder 3, the delay circuit 1 and the attenuator 2 constitute a positive feedback loop. The output $e_3$ of the delay circuit 1 is also attenuated by another attenuator 4 having an attenuation factor $\beta(\beta<1)$. The signal attenuated by the attenuator 4 is subtracted in a subtractor 5 from the output $e_2$ of the adder 3 to provide an output video signal $e_0$.

The output signals $e_2$ and $e_3$ from the adder 3 and delay circuit 1 are expressed as follows respectively:

$$e_2 = \frac{1}{1 - \alpha \cdot \exp(-S\tau)} \cdot e_1 \quad (1)$$

$$e_3 = \exp(-S\tau) \cdot e_2 \quad (2)$$

where $\tau$ is the delay time, and S is the operator of Laplace transformation.

Thus, the general transfer function G(S) of the contour enhacing circuit is given by $$G(S) = \frac{e_0}{e_1} = \frac{1 - \beta \cdot \exp(-S\tau)}{1 - \alpha \cdot \exp(-S\tau)} \quad (3)$$

Figure 3:
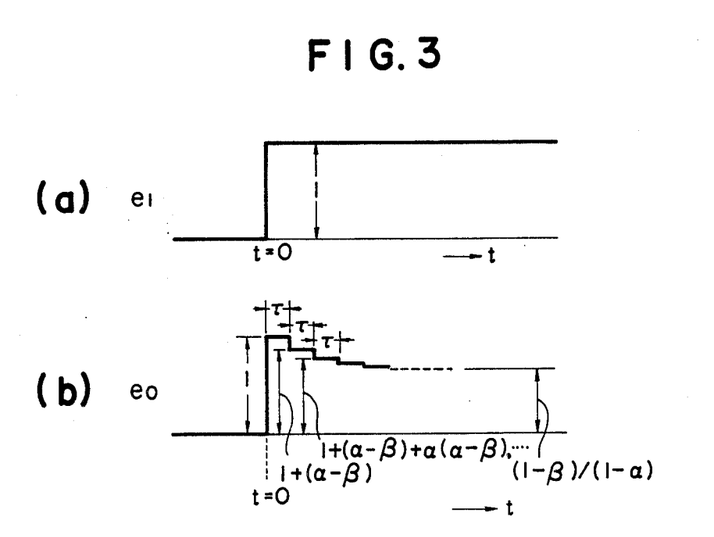
FIGS. 3(a) and 3(b) show waveforms of a step input to and a response output from the circuit shown in FIG. 2, respectively.

The indicial response of the output $e_0$ relative to the step input $e_1$ is progressively attenuated with lapse of successive times $\tau$ and approaches finally to $1-\beta/1-\alpha$ as shown in FIGS. 3(a) and 3(b). When the relation between $\alpha$ and $\beta$ is $\alpha > \beta$, the circuit acts as a vertical contour enhancing circuit, while, when the relation is $\alpha < \beta$, the circuit operates with a reverse characteristic.

The present invention is based on such a contour enhancing circuit and provides a vertical emphasis circuit which is a modification of such a circuit so as to improve the S/N ratio of a video signal in a magnetic recording and reproducing apparatus. The circuit according to the present invention is constructed to satisfy the following requirements for the purpose of practically improving the S/N ratio:

(1) Complementary matching between the pre-emphasis characteristic and the de-emphasis characteristic can be attained.

(2) The number of circuit elements essentially required for determining the characteristics can be decreased to a minimum.

(3) A non-linear circuit enabling to increase the amount of emphasis can be easily added.

(4) The circuit is applicable to both of a luminance signal system and a chrominance signal system.

Figure 4:
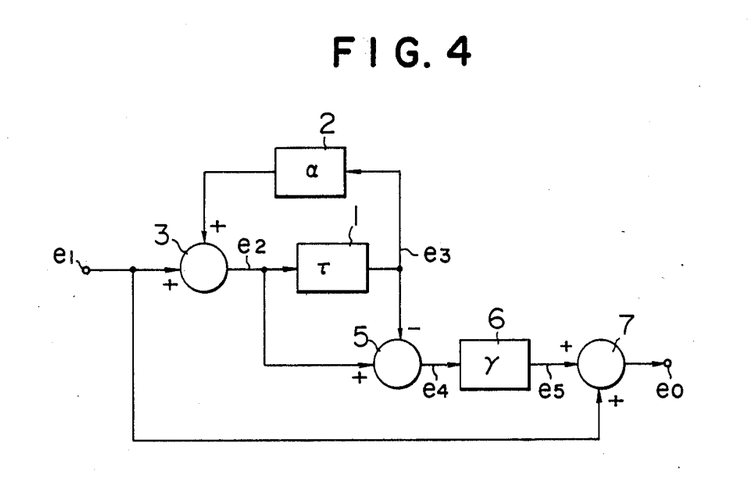
FIG. 4 is a block diagram showing the structure of an embodiment of the vertical emphasis circuit according to the present invention.

FIG. 4 shows the basic structure of a first embodiment of the vertical emphasis circuit according to the present invention, when a luminance signal is applied as its input signal $e_1$. The circuit of the present invention shown in FIG. 4 differs from the contour enhancing circuit shown in FIG. 2 in that the constant $\beta$ of the attenuator 4 is included in a constant $\gamma$ of a level adjusting circuit 6 which is a linear amplifier, and another adder 7 is provided to make an additional arithmetic operation. By virtue of such a modification, the number of circuit elements essentially required for determining the characteristics can be decreased to a minimim thereby facilitating practical determination of the emphasis constants, and insertion of a non-linear is facilitated. Thus, the present invention provides a vertical emphasis circuit which operates effectively when put into practical use.

The output $e_2$ of the adder 3 and the output $e_3$ of the delay circuit 1 relative to the input $e_1$ are given by the aforementioned equations (1) and (2) respectively, and, as a result, an output $e_4$ given by the following equation (4) appears from the subtractor 5:

$$e_4 = \frac{1 - \exp(-S\tau)}{1 - \alpha \cdot \exp(-S\tau)} \cdot e_1 \quad (4)$$

The transfer function G(S) is expressed as follows:

$$G(S) = \frac{e_0}{e_1} = \frac{(1 + \gamma) - (\alpha + \gamma)\exp(-S\tau)}{1 - \alpha \cdot \exp(-S\tau)} \quad (5)$$

where $\gamma$ is the gain of the level adjusting circuit 6.

Suppose that $\gamma$ in the equation (5) is $$\gamma = \frac{\beta - \alpha}{1 - \beta}.$$

Then, the equation (5) becomes isomorphic to the equation (3) of the transfer function, and the circuit shown in FIG. 4 has a characteristic similar to that of the contour enhancing circuit shown in FIG. 2.

Suppose herein that the values of $\alpha$ and $\gamma$ in a pre-emphasis circuit and a de-emphasis circuit are as follows:

(1) In the pre-emphasis circuit,
$\alpha = K_1$ and $\gamma = X$
(2) In the de-emphasis circuit,
$\alpha = K_2$ and $\gamma = -\frac{X}{1 + X}$ where $K_1$ and $K_2$ are emphasis coefficients having the relation $0 < K_1 < K_2 < 1$ therebetween, X is the amount of emphasis, and $1 + X = \frac{1 - K_1}{1 - K_2}$. (6)

Then, the pre-emphasis characteristic Gp(S) of the pre-emphasis circuit and the de-emphasis characteristic Gd(S) of the de-emphasis circuit in terms of the transfer characteristics are as follows respectively:

$$Gp(S) = (1 + X)\frac{1 - K_2 \cdot \exp(-S\tau)}{1 - K_1 \cdot \exp(-S\tau)} \quad (7)$$

$$Gd(S) = \frac{1}{1 + X} \cdot \frac{1 - K_1 \cdot \exp(-S\tau)}{1 - K_2 \cdot \exp(-S\tau)} \quad (8)$$

There is the following relation between the pre-emphasis characteristic Gp(S) and the de-emphasis characteristic Gd(S):

$$Gp(S) \cdot Gd(S) = 1 \quad (9)$$

Therefore, the desired complementary matching condition between the pre-emphasis circuit and the de-emphasis circuit can be completely satisfied. The emphasis coefficients $K_1$ and $K_2$ and the amount of emphasis X are determined by two independent variables as will be apparent from the equation (6) described above, and the circuit characteristics can be determined by determining the two emphasis coefficients $K_1$, $K_2$ or one of the two emphasis coefficients and the amount of emphasis X. FIG. 5(b) shows frequency characteristics $|Gp(j\omega)|$ and $|Gd(j\omega)|$ of the pre-emphasis and de-emphasis circuits respectively. It will be seen in FIG. 5(a) that vertical frequency spectrum components of the luminance signal are distributed around a central component or a horizontal scanning frequency spectrum component having a value of nfH, where n is an integer, and fH is the horizontal scanning frequency. It will be also seen in FIG. 5(a) that noise spectrum components in the reproduced picture are uniformly distributed over the entire range as shown by the hatching. It will be seen from the characteristic curves shown in FIG. 5(b) that the vertical frequency spectrum components are emphasized by the pre-emphasis characteristic $|Gd(j\omega)|$ and are suppressed by the de-emphasis characteristic $|Gd(j\omega)|$.

Consequently, there occurs no signal level change in the video signal components passed through the pre-emphasis circuit and de-emphasis circuit. On the other hand, the level of noise occurred during reproduction is suppressed by the de-emphasis characteristic $|Gd(j\omega)|$.

Figure 5:
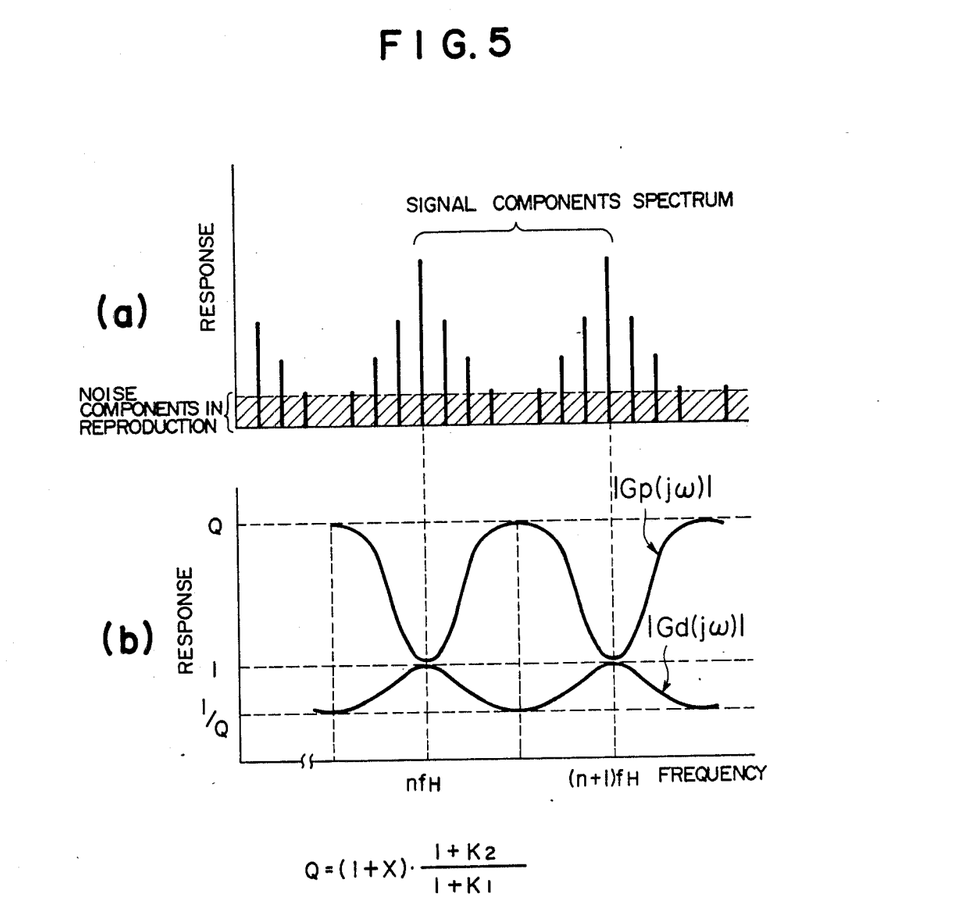
FIG. 5(a) and 5(b) show frequency characteristics of the vertical emphasis circuit shown in FIG. 4 when a luminance signal is applied as an input thereto.
Figure 6:
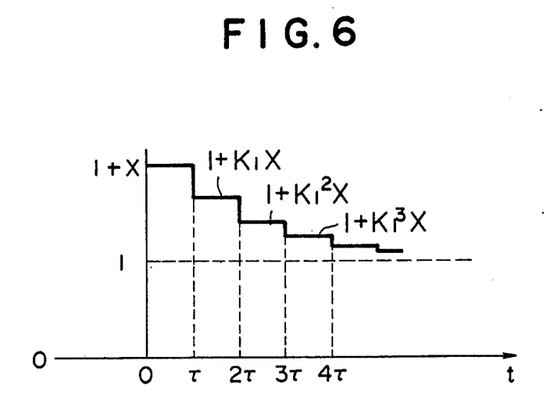
FIGS. 6 and 7 show step responses of the circuit shown in FIG. 4 when it operates as a vertical pre-emphasis circuit and a vertical de-emphasis circuit respectively.
Figure 7:
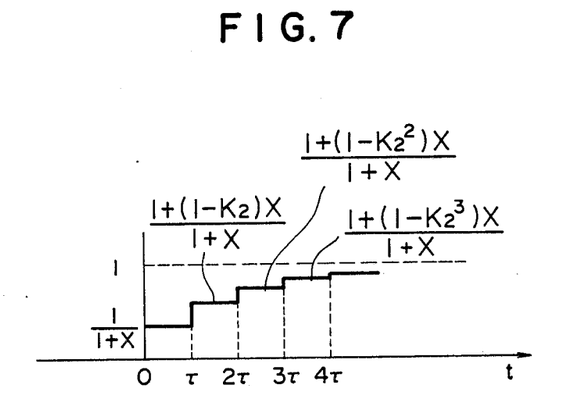

FIG. 6 shows the step response of the pre-emphasis circuit, and FIG. 7 shows the step response of the de-emphasis circuit. It will be seen that, when a luminance signal subjected to the pre-emphasis is recorded on a magnetic tape, and the signal reproduced by a reproducing system is subjected to the de-emphasis, vertical frequency spectrum components of the reproduced luminance signal coincide finally with those of the original signal, and noise that may be mixed in the reproducing system is suppressed by the de-emphasis circuit, so that the S/N ratio can be improved. The effect of improving the S/N ratio covers the entire signal frequency range from the low frequency band to the high frequency band as will be apparent from the characteristics shown in FIGS. 5(a) and 5(b).

Application of the vertical emphasis circuit of the present invention to pre-emphasis and de-emphasis of a chrominance signal will now be described. In the NTSC system, a chrominance signal modulated in a color subcarrier having a frequency of 227.5 fH (fH: the horizontal scanning frequency) is multiplexed with a luminance signal in a relation offset by a frequency of $\frac{1}{2}$ fH, and vertical frequency spectrum components are distributed around a central component or a horizontal scanning frequency spectrum component having a value of $(n+\frac{1}{2})$ fH. Therefore, when the circuit shown in FIG. 4 is used intact to delay the chrominance signal by $\tau=1H$ by the 1H delay circuit 1, the signal feedback mode is nagative instead of positive, and it is necessary to correct the phase of the color subcarrier to achieve the positive feedback. That is, it is necessary to add a function of 0.5/227.5 fH delay correction to the 1H delay circuit 1 or the invert the phase of the output of the 1H delay circuit 1.

On the other hand, in the case of the PAL system, a chrominance signal modulated in a color subcarrier having a frequency of 283.75 fH is multiplexed with a luminance signal in a relation offset by a frequency of $\frac{1}{4}$ fH, and the B−Y signal and (R−Y) signals have vertical frequency spectrum components distributed around a horizontal scanning frequency spectrum componet having a value of $(n-\frac{1}{4})$ fH and a horizontal scanning frequency spectrum component having a value of $(n+\frac{1}{4})$ fH, respectively; Therefore, the vertical emphasis circuit should be modified so that it operates in a manner similar to the circuit shown in FIG. 4 with respect to the central spectrum components having the values of $(n\pm\frac{1}{4})$ fH. That is, it is necessary to replace the 1H delay circuit 1 shown in FIG. 4 by a 2H delay circuit and to add a function of 0.5/283.75 fH delay correction or to invert the phase of the output of the 2H delay circuit.

Figure 8:
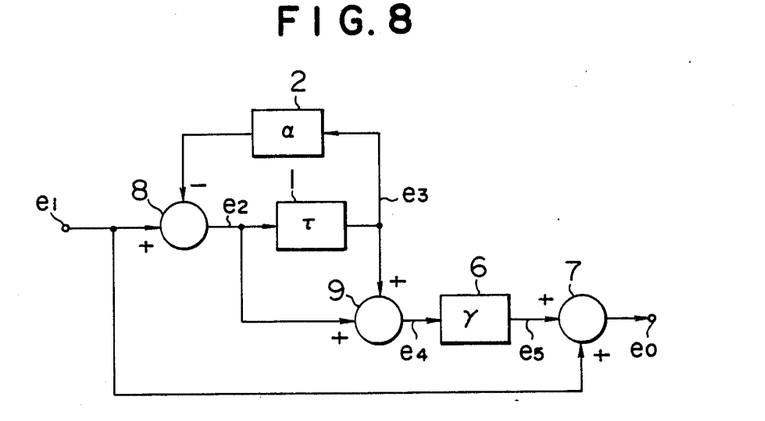
FIG. 8 is a block diagram showing the structure of the vertical emphasis circuit when it receives a chrominance signal as its input.

FIG. 8 shows a modification of the vertical emphasis circuit for emphasizing a chrominance signal when the present invetnion is applied to the NTSC system. In this modification of the circuit shown in FIG. 4, the phase of the output of the 1H delay circuit 1 is inverted. In FIG. 8, the adder 3 and subtractor 5 in FIG. 1 are replaced by a subtractor 8 and an adder 9 respectively. According to a numerical expression of the transfer characteristics of the resultant pre-emphasis circuit and de-emphasis circuit, the pre-emphasis characteristic Gp(S) and de-emphasis characteristic Gd(S) are respectively as follows:

$$Gp(S) = (1 + X) \cdot \frac{1 + K_2 \cdot \exp(-S\tau)}{1 + K_1 \cdot \exp(-S\tau)} \quad (10)$$

$$Gd(S) = \frac{1}{1 + X} \cdot \frac{1 + K_1 \cdot \exp(-S\tau)}{1 + K_2 \cdot \exp(-S\tau)} \quad (11)$$

Figure 9:
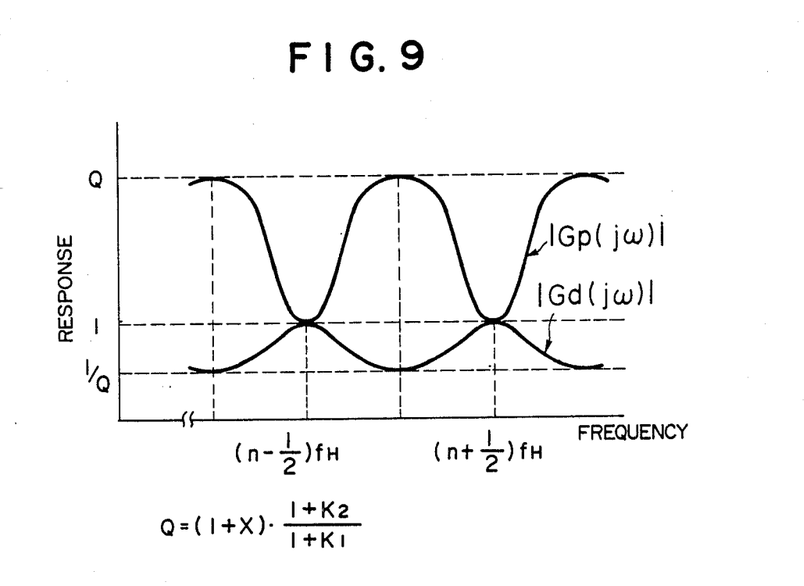
FIG. 9 shows frequency characteristics of the circuit shown in FIG. 8.

FIG. 9 shows frequency characteristics $|Gp(j\omega)|$ and $|Gd(j\omega)|$ of these emphasis circuits respectively. The vertical frequency spectrum components of the chrominance signal are distributed around a central component having a value of $(n+\frac{1}{2})$ fH where n is an integer, and fH is the horizontal scanning frequency. Thus, the S/N ratio of the chrominance signal is improved by the de-emphasis characteristic $|Gd(j\omega)|$ as in the case of the luminance signal.

Although the effect of improvement of the S/N ratio is enhanced more by applying a larger amount of de-emphasis, a larger amount of pre-emphasis is required for that purpose. A non-linear circuit is required to avoid distortion of the signal waveform due to application of a larger amount of pre-emphasis. Incorporation of such a non-linear circuit provides such an emphasis characteristic that the amount of emphasis is small for a large signal and large for a small signal.

Figure 10:
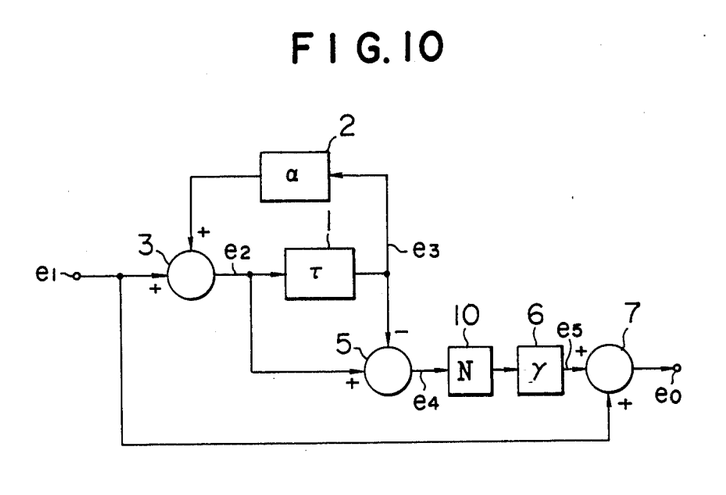
FIG. 10 is a block diagram of a modification in which a non-linear circuit is added to the vertical emphasis circuit shown in FIG. 4.

When the input signal is a luminance signal, it is preferable to interpose a non-linear circuit 10 between the subtractor 5 and the level adjusting circuit 6 as shown in FIG. 10. The non-linear circuit 10 may be interposed between the level adjusting circuit 6 and the adder 7. This non-linear circuit 10 can be provided by a limiter circuit which clips the signal at a predetermined emplitude level.

Similarly, when the input signal is a chrominance signal, such a non-linear circuit is preferably interposed between the adder 9 and the level adjusting circuit 6 or between the level adjusting circuit 6 and the adder 7 in FIG. 8.

Figure 11:
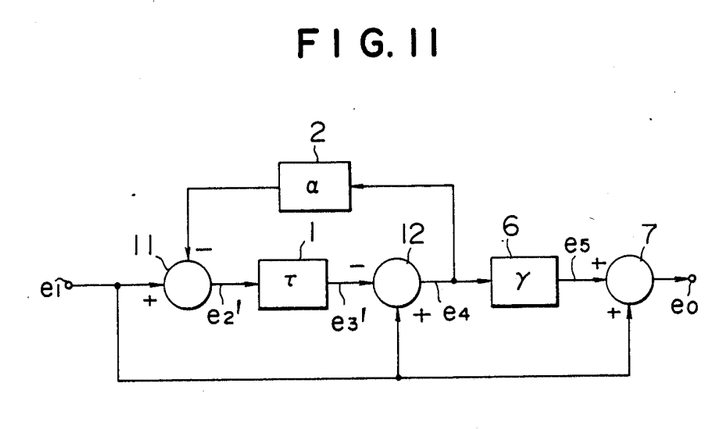
FIGS. 11, 12 and 13 are block diagrams showing the structure of a second embodiment of the present invention and its modifications respectively.

FIG. 11 shows a second embodiment of the present invention when a luminance signal is its input signal. The second embodiment of the emphasis circuit comprises, as basic elements, a 1H delay circuit 1, a subtractor 12, an attenuator 2 and another subtractor 11 which constitute a positive feedback loop carrying out positive feedback operation. An input video signal $e_1$ is applied to the subtractors 11 and 12. The output signal $e_4$ of the subtractor 12 and the transfer function G(S) of the circuit can be expressed by the equations (4) and (5) respectively as in the case of the first embodiment. When the conditions set forth in the expression (6) are employed so that the emphasis circuit can operate as a pre-emphasis circuit and a de-emphasis circuit, the pre-emphasis circuit and the de-emphasis circuit have the pre-emphasis characteristic and the de-emphasis characteristic given by the equations (7) and (8) respectively. Therefore, a vertical pre-emphasis circuit and a vertical de-emphasis circuit operable with the frequency characteristics shown in FIG. 5 are provided.

Figure 12:
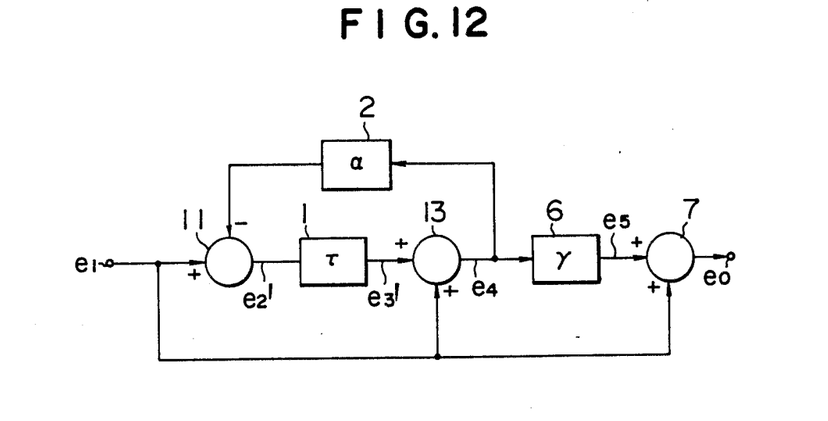

FIG. 12 is a modification of the second embodiment of the present invention so that the circuit is applicable to the emphasis of a chrominance signal of the NTSC system. As described already with reference to FIG. 8, the phase of the color subcarrier is inverted when the chrominance signal is delayed by 1H. Therefore, the subtractor 12 in FIG. 11 is replaced by an adder 13 in FIG. 12. In this case too, a pre-emphasis circuit and a de-emphasis circuit emphasizing the chrominance signal in the vertical direction and having the frequency characteristics shown in FIG. 9 are obtained as in the case of the first embodiment. A pre-emphasis circuit and a de-emphasis circuit applicable to a chrominance signal of the PAL system can similarly be provided by making a necessary modification as described with reference to the first embodiment.

Figure 13:
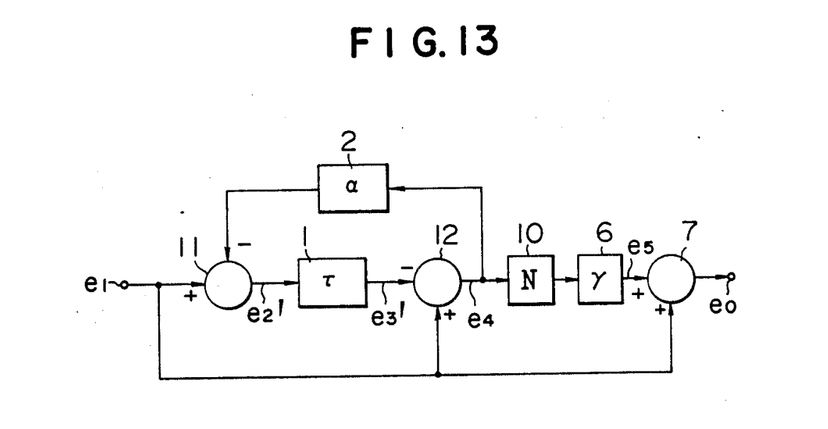

In FIG. 13, a non-linear circuit 10 is interposed between the subtractor 12 and the level adjusting circuit 6 in the luminance-signal vertical emphasis circuit shown in FIG. 11.

When non-linear emphasis is desired for a chrominance signal too, a non-linear circuit as described with reference to FIG. 12 is preferably provided.

We claim:

1. An emphasis circuit emphasizing a video signal in the vertical direction of a television picture, comprising:
   a first arithmetic circuit adding a feedback signal to an input video signal;
   a delay circuit delaying the output of said first arithmetic circuit by a predetermined delay time to generate a delayed output which provides said feedback signal;
   a second arithmetic circuit producing a signal indicative of the amplitude difference between the output of said first arithmetic circuit and that of said delay circuit;
   a linear amplifier circuit adjusting the magnitude of said amplitude difference signal applied from said second arithmetic circuit to a predetermined level; and
   a third arithmetic circuit producing an output video signal by adding the output of said linear amplifier circuit to said input video signal.

2. An emphasis circuit as claimed in claim 1, further comprising a non-linear circuit interposed between said second and third arithmetic circuits for limiting the amount of emphasis depending on the output of said second arithmetic circuit.

3. An emphasis circuit as claimed in claim 1, wherein said input video signal is a luminance signal, and the delay time of said delay circuit is one horizontal scanning period.

4. An emphasis circuit as claimed in claim 1, wherein said input video signal is a chrominance signal, and said feedback signal is provided by inverting the phase of the output of said delay circuit.

* * * * *